Dec. 23, 1969  R. J. BOUDREAU  3,485,275

PORTABLE SAW GUIDE

Filed Dec. 2, 1966

United States Patent Office

3,485,275
Patented Dec. 23, 1969

3,485,275
PORTABLE SAW GUIDE
Robert Joseph Boudreau, 176 Linden Ave.,
Malden, Mass. 02148
Filed Dec. 2, 1966, Ser. No. 598,710
Int. Cl. B27d 27/06
U.S. Cl. 143—6                                    7 Claims

ABSTRACT OF THE DISCLOSURE

A fixed track above a work surface, for guiding a portable electric saw thereacross, in which a stock guide is pivotally positioned at one end of the track intermediate the track and the work surface for angular adjustment of stock relative to the saw.

---

This invention relates to a mitre-box assembly for use with, e.g., a portable saw and in which the angularity of the stock relative to the saw is readily adjustable.

It is a principle object of this invention to provide a simple mitre box which requires but minimal space for operation and which is relatively inexpensve to manufacture and hence is ideal for the home hobbyist. Another object of this invention is to provide a mitre box in which saws may be placed without the necessity of any special attaching devices. Still another object of this invention is to provide a mitre box which can be readily adjusted to receive saws of different sizes.

In general the invention features a guide support for guiding a portable tool over a work surface. The guide support is adapted to be fixedly positioned relative to a base surface. A stock guide is pivotally positioned at one end of the guide support for adjusting the angular position of stock relative to the guide support. Thus a saw may simply be placed on the guide support and moved therealong for accurate cutting at any predetermined angle.

Other objects, features and advantages of this invention will be apparent from the following detailed description thereof together with the accompanying drawings in which.

Figure 1:
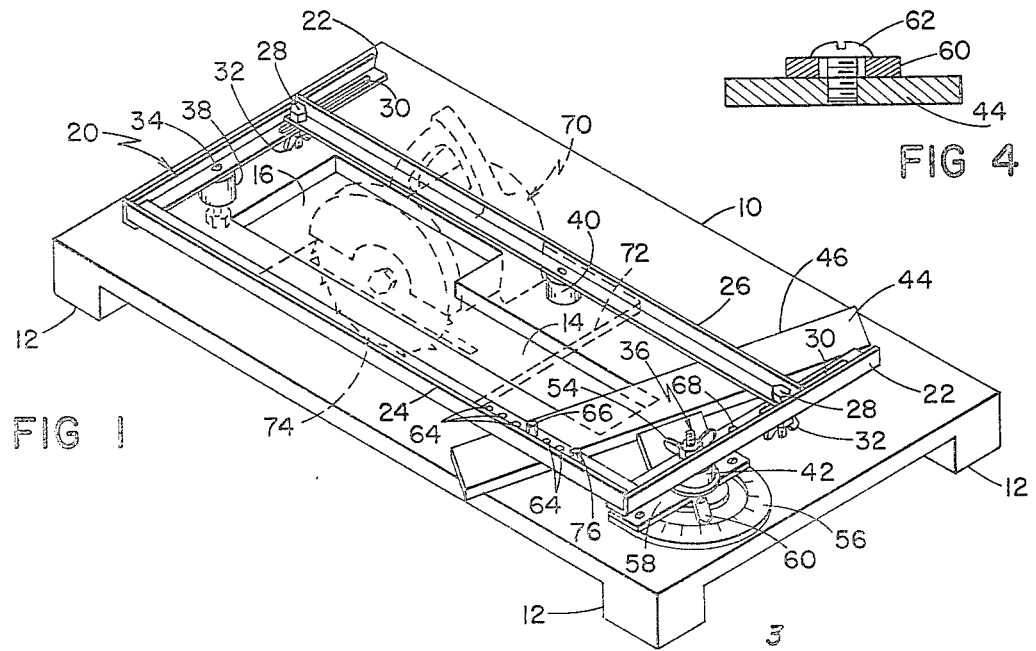
FIG. 1 is an isometric view of a mitre box assembly according to the invention.
Figure 2:
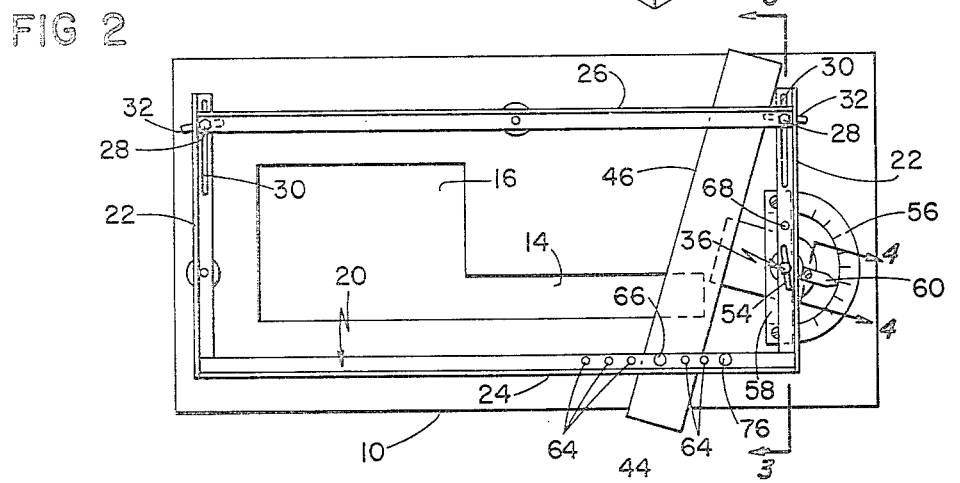
FIG. 2 is a plan view thereof.

With reference now to FIGS. 1 and 2 of the drawings it will be seen that a base or work surface 10 is provided supported on legs 12. A longitudinal slot 14, enlarged at one end 16, is provided for receiving a saw blade 74 operatively therein.

Supported above the work surface 10 is a guide support or track 20 which may be constructed of angle iron stock. The track 20 includes a pair of members 22 extending transversely of slot 14 at each end thereof and another pair of members 24, 26 extending longitudinally of slot 14 on either side thereof. The horizontal surfaces of members 24, 26 provide support surfaces for the sole plate 72 of a saw 70 and the vertical surfaces of members 24, 26 provide guide surfaces for engaging the sole plate 72 of saw 70 to guide the saw accurately therealong.

Figure 3:
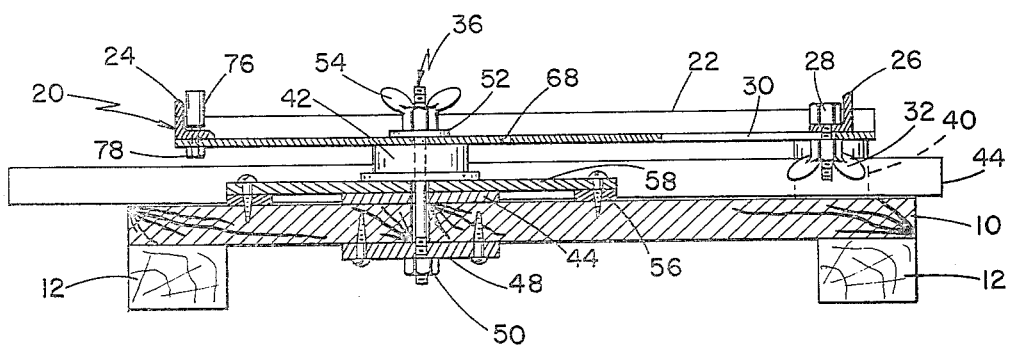
FIG. 3 is an enlarged sectional view along the line 3—3 of FIG. 2.

As is most clearly shown in FIG. 3 the longitudinally extending track members 24, 26 are mounted in a common plane on top of the horizontal surfaces of the transverse track members 22. One of the longitudinal track members 24 is fixedly connected, as by welding, to the transverse track members 22 in a position a predetermined distance from slot 14, approximately equal to the average distance of blades 74 from the nearest edge of the sole plates 72 of saws 70. This distance is relatively uniform among manufacturers of circular portable electric saws.

The other longitudinal track member 26 is transversely adjustably connected to transverse track members 22 to permit adjustment for saws 70 having different size sole plates 72. The track member 26 is fastened to members 22 by bolts 28 which extend through drilled holes in member 26 and slidably through transverse slots 30 in members 22. Wing nuts 32 on bolts 28 are provided for loosening and tightening members 22, 26 and for permitting adjustment of member 26 relative to members 22.

Track 20 is fastened to work surface 10 by fastening members 34, 36 at each end thereof. Spacing members 38, 40, 42 are also provided between track 20 and work surface 10 for spacing to permit stock to be positioned therebetween. Spacing member 40 on track member 26 is fastened only to the member 26 and is movable therewith across work surface 10.

A stock guide 44 is pivotally mounted at the end of track 20, remote from the enlarged end 16 of slot 14, to provide a guide edge 46 angularly adjustable relative to a saw 70 in track 20. The stock guide 44 is pivoted about fastening member 36. As best shown in FIG. 3, fastener 36 is a bolt threaded on both ends. One end of fastener 36 is threaded in a threaded opening of a plate 48 which is screwed onto the bottom of base 10. A lock nut 50 on the end of fastener 36 protruding through plate 48 positively locates fastener 36. Fastener 36 extends through a hole in base 10, a hole in stock guide 44, about which guide 44 pivots, a hole in spacing member 42, a hole in one track member 22, and a washer 52, to a wing nut 54 threaded on the other end thereof. By loosening and tightening wing nut 54 adjustment of stock guide 44 is possible.

Figure 4:
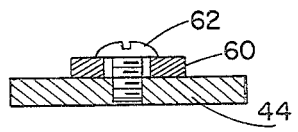
FIG. 4 is an enlarged sectional view along the line 4—4 of FIG. 2.

A protractor 56 is provided for accurate adjustment of guide 44. The protractor 56 is screwed to base 10 and includes a connecting member 58 connecting opposite ends of the protractor 56. Protractor 56 is accurately located by fastener 36 which also extends through a hole in member 58. A pointer 60 on guide 44 extends to protractor 56 for indicating cutting angles. As illustrated in FIG. 4, pointer 60 is fastened to guide 44 by screw 62. The hole in pointer 60 is transversely enlarged to permit adjustment of the pointer.

Stock guide 44 is preferably of wood or some other material which will not damage a blade. The guide 44 may be preslotted for standard 90° and 45° cuts. In any event, track 24 is preferably provided with a plurality of holes 64 along the end adjacent guide 44. A stop pin 66 is provided to be selectively positioned in one of holes 64 to provide an adjustable stop for cuts of different angularity and for different size saws to avoid damage to the stock guide 44. When pin 66 is not in use it may be stored in hole 68 in one of transverse track members 22. A second pin 76 may be positioned in one of holes 64 and fastened there by nut 78 in a permanent location to locate a permanent stop position for straight 90° cutting.

In operation, a saw 70 is positioned with its sole plate 72 on longitudinal track members 24, 26. If necessary, wing nuts 32 are first loosened, track 26 adjusted for the saw 70 and nuts 32 tightened again. Wing nut 54 is then loosened and guide 44 moved to the proper angle for the desired stock nut. Wing nut 54 is then tightened and stock positioned against guide edge 46. Stop pin 76 is positioned in the proper hole 64 for a 90° cut with the particular saw size. If an angle cut is to be made pin 66 is located in another of holes 64 to provide an advanced stop position for the saw. The saw is then moved along track members 24, 26 to cut the stock. If pointer 60 is inaccurately aligned, guide 44 is adjusted for an exact 90° cut and then screw 62 is loosened and ponter 60 adjusted, whereupon screw 62 is tightened again. If a bevel cut is to be made with a saw, the saw is removed to the enlarged end 16 of slot 14 and is tilted prior to cutting.

Other embodiments of this invention will occur to those skilled in the art which are within the scope of the following claims.

What is claimed is:

1. A mitre box assembly, for use with a portable tool having a sole plate and an operative member extending below said sole plate, comprising, in combination:

a base surface having an aperture therein for receiving a portion of the operative member of said tool therein;

a guide support spaced above and connected to said base surface in a fixed predetermined position and including a pair of parallel support surfaces in a horizontal plane which surfaces are spaced from each other to define an opening over said aperture, said surfaces adapted for supporting said sole plate thereon with said operative member extending through said opening into said aperture, said guide support also including transverse members interconnected between said support surfaces, and said guide support further including an upstanding guide surface on a portion of at least one of said support surfaces remote from the other of said support surfaces for guiding said tool on movement thereof along said support surfaces;

said aperture, opening and support surfaces elongated in one direction for permitting movement of said tool and its said operative member relative thereto; and a stock guide, having an upstanding elongated guide edge extending generally transversely of said aperture and across said opening, pivotally connected to said base surface and positioned between said base surface and said guide support at one end of said aperture and said opening, and a single means for adjusting the angular relation of said stock guide relative to said aperture, whereby said guide edge is adjustable with said stock guide relative to said guide support for angular adjustment of stock against said guide edge relative to said operative member.

2. The mitre box claimed in claim 1 in which said aperture is transversely enlarged at least at the end thereof remote from said one end.

3. The mitre box claimed in claim 1 in which said guide support has a plurality of stop positions adjacent said one end of said aperture spaced in the direction of elongation of said aperture, said opening and support surfaces.

4. The mitre box claimed in claim 3 in which said stock guide extends transversely across said aperture.

5. The mitre box claimed in claim 4 in which said stop positions are defined by a plurality of openings in at least one of said support surfaces and further including at least one top member in one of said openings for limiting movement of said sole plate along said support surfaces.

6. The mitre box claimed in claim 5 in which said stock guide extends transversely across said aperture.

7. The mitre box claimed in claim 6 in which said aperture is transversely enlarged at least at the end thereof remote from said one end.

References Cited

UNITED STATES PATENTS

| | | | |
|---|---|---|---|
| 2,599,893 | 6/1952 | Butler | 143—6 |
| 2,630,147 | 3/1953 | Garberg | 143—6 X |
| 2,765,820 | 10/1956 | Perkins | 143—6 |
| 3,379,229 | 4/1968 | Siegal | 143—6 X |

DONALD R. SCHRAN, Primary Examiner

U.S. Cl. X.R.

143—47, 90

PO-1050
(5/69)

UNITED STATES PATENT OFFICE
CERTIFICATE OF CORRECTION

Patent No. 3,485,275            Dated December 23, 1969

Inventor(s)            Robert Joseph Boudreau

It is certified that error appears in the above-identified patent and that said Letters Patent are hereby corrected as shown below:

In the Specification, column 2, line 71, "ponter" should read --pointer--.

In the Claims, column 4, line 18, "top" should read --stop--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents